Figure 1:
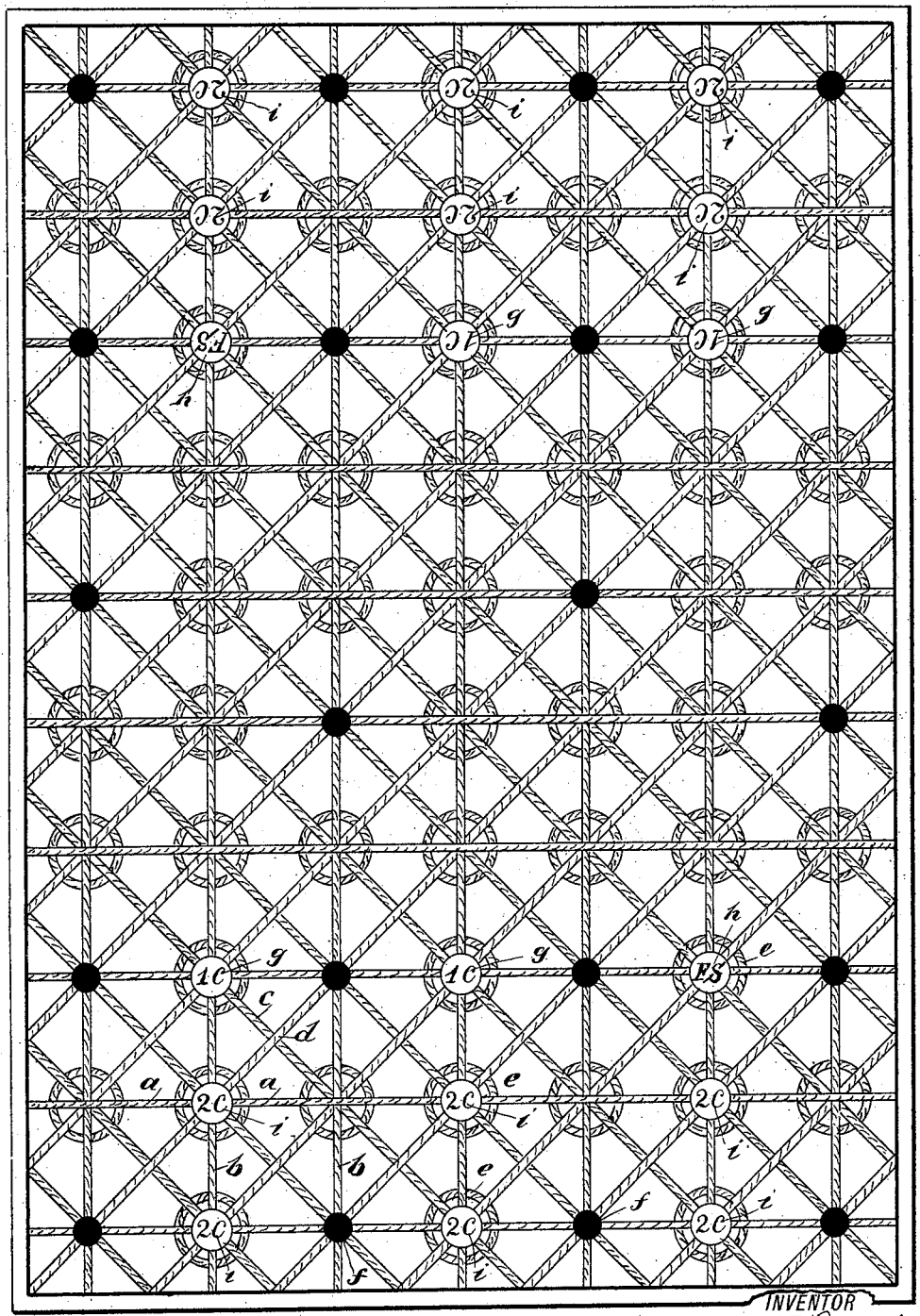

(No Model.) 2 Sheets—Sheet 1.

H. T. PYCROFT.
GAME APPARATUS.

No. 603,539. Patented May 3, 1898.

WITNESSES:

INVENTOR
H. T. Pycroft.
BY
ATTORNEYS.

(No Model.)   H. T. PYCROFT.   2 Sheets—Sheet 2.
GAME APPARATUS.
No. 603,539.   Patented May 3, 1898.
Fig. 2.
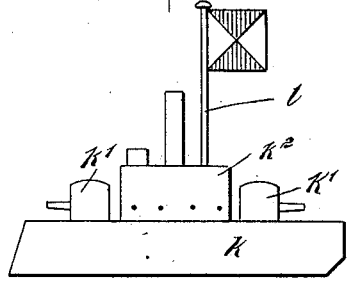
Fig. 3.
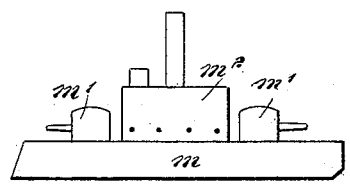
Fig. 4.
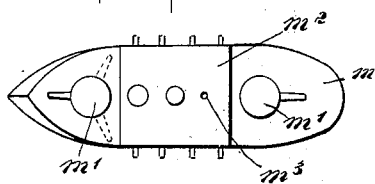
Fig. 5.
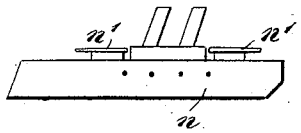
Fig. 6.
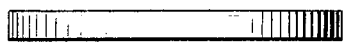
Fig. 10.
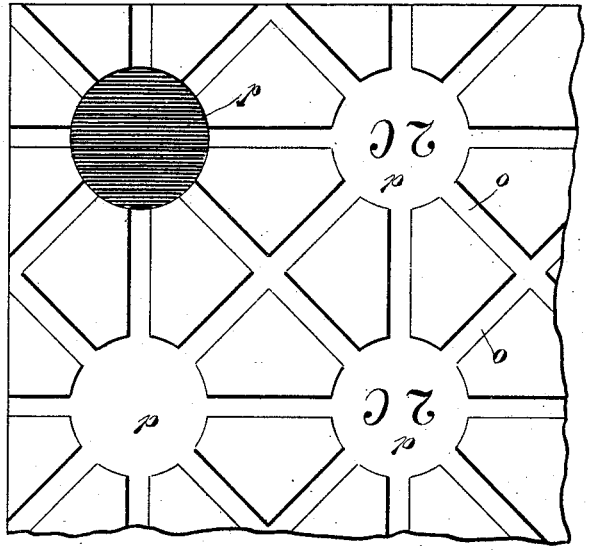
Fig. 7.
Fig. 8.
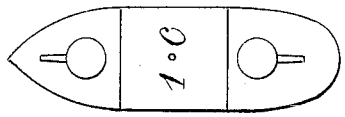
Fig. 9.
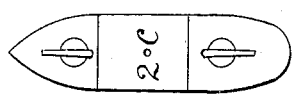
Fig. 11.
Fig. 12.
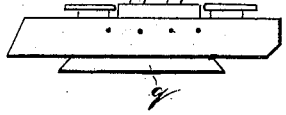
WITNESSES:
H. Hellyer
Isaac B. Owen
INVENTOR
H. T. Pycroft.
BY
ATTORNEYS.

UNITED STATES PATENT OFFICE.

HENRY THOMAS PYCROFT, OF PARNELL, NEW ZEALAND.

GAME APPARATUS.

SPECIFICATION forming part of Letters Patent No. 603,539, dated May 3, 1898.

Application filed April 19, 1897. Serial No. 632,821. (No model.)

*To all whom it may concern:*

Be it known that I, HENRY THOMAS PYCROFT, of Parnell, Auckland, New Zealand, have invented a new and useful Improvement in Game Apparatus, of which the following is a full, clear, and exact description.

The invention has for its object to provide a superior game of that class in which a board is provided and men or counters are arranged to operate in a certain manner on the board.

The invention also has for its object to provide a game representing naval warfare.

To this end I employ a board with certain lines and figures produced thereon to represent the positions of ships and the points of the compass on which they are to move. I also employ counters having the form of naval vessels, which are to move along the board.

The invention will be fully described hereinafter and defined in the claims.

Reference is to be had to the accompanying drawings, forming a part of this specification, in which similar characters of reference indicate corresponding parts in all the figures.

Figure 1 is a plan view of the board. Fig. 2 is a side elevation of a counter representing the flag-ship of the fleet. Fig. 3 is a side elevation of one of the counters representing a first-class line-of-battle ship. Fig. 4 is a plan view of the counter shown in Fig. 3. Fig. 5 is a side elevation of a counter rspresenting a second-class line-of-battle ship. Fig. 6 is a side elevation of a modified form of counter. Figs. 7 and 8 are plan views of this modified form of counter. Fig. 9 is a plan view of another modified form of counter. Fig. 10 is a fragmentary plan view of a modified form of the board. Fig. 11 is a detail section thereof, and Fig. 12 is a side elevation of a counter for use with the board shown in Figs. 10 and 11.

Referring to Figs. 1 to 5, both inclusive, the game-board has produced thereon a series of lines $a$ and $b$, crossing each other at right angles and forming squares throughout the surface of the board. The game-board has also produced thereon lines $c$ and $d$, running diagonally with reference to the lines $a$ and $b$ and at right angles with reference to each other. At each point at which all of the lines $a, b, c$, and $d$ intersect the game-board has produced thereon a circle $e$ or a dot $f$. I preferably provide twenty dots $f$ and place circles at the remaining points of intersection. All the lines $a, b, c$, and $d$ and those forming the circles $e$ are preferably given the appearance of ropes, which is in harmony with the nautical character of the game. Nine of the circles $e$ at each end of the board are provided with characters $g$, $h$, and $i$. The characters $g$ are applied to two circles $e$ at each end of the board and consist of the numeral "1" and letter "C," placed side by side. The characters $h$ are one at each end of the board, and each consists of the letters "F S," placed side by side. The characters $i$ are applied to six circles at each end of the board, and each character $i$ consists of the numeral "2" and the letter "C," placed side by side. The characters $g$ indicate the positions of the first-class line-of-battle ships. The characters $h$ indicate the positions of the flag-ships. The characters $i$ indicate the positions of the second-class line-of-battle ships.

The counters representing the flag-ships, as shown in Fig. 2, consist each of a structure having a hull $k$ with turrets $k'$ and deck structures $k^2$. The counters $k$ are also provided with flags $l$, removably set thereon.

The counters representing the first-class line-of-battle ships are each structures having hulls $m$ lower than the hulls $k$ and with turrets $m'$ and deck structures $m^2$ similar to the turrets $k'$ and deck structures $k^2$ of the flag-ship. The deck structures $m^2$ of each first-class line-of-battle ships are provided with orifices $m^3$, (shown in Fig. 4,) in which orifices the flag $l$ may be set, as required by the rules of the game, to be hereinafter explained.

The counters representing the second-class line-of-battle ships, as shown in Fig. 5, have hulls $n$ and guns $n'$, mounted en barbette as contradistinguished from the turrets in Figs. 2 to 4. The second-class line-of-battle ships are also provided with orifices wherein the flag $l$ may be set.

I will now describe the preferred rules for playing the game.

The counters are divided into two hostile fleets, respectively stationed at each end of the board and with the arrangement indicated by the characters $g$, $h$, and $i$, as previously explained. To play the game, the ships should be placed one fleet pointed north and the other pointed south. When the flag-ship is lost, the admiral's flag is hoisted on one of the two first-class ships in the fleet. When the first-class ships are lost, the flag is hoisted on the second-class ships in turn. When the flag-ship is taken, any other ship on which the flag is hoisted is called the "acting flagship." That fleet is defeated which has lost more than half each of its first and second class ships. A move is an advance or retreat along the lines from circle to circle $e$ or from circle $e$ to spot $f$. A turn is a change in the circles from line to line. The ships are moved by pushing them along the lines. Ships may move along all lines and stop on all circles, but they may turn on the light circles only. A flag-ship or a first-class ship may make three moves in any direction, not counting the circle it is on, or it may make three turns in any direction, not counting the line it is on, or it may make as many moves or turns in any order or direction as make three in all. A second-class ship may make two moves or turns or moves and turns the same as the first-class ship, excepting with reference to the number. In neither case may a ship make more than one of her moves astern. Moves may be distributive. A player makes as many moves or turns or moves and turns with a given ship as he wishes and gives the remainder to any other ship or ships, so that the number which he has to distribute depends upon the moves of the ship first moved. Fore-and-aft guns have a sweep of one-half a circle. The range of the fore-and-aft guns of a flag-ship or first-class ship is to the second circle from that on which she is located. The range of the fore-and-aft guns of a second-class ship is from circle to circle. A ship is under concentrated fire when she receives the full fire of more fore-and-aft guns than she can return. The line of fire must be judged by the eye. A ship on one of the spots $f$ is crippled as long as she stops there. She cannot capture an enemy. She is liable to be captured by an enemy of any class firing along her proper lines, with one gun if of equal or superior class, with both guns if of inferior class. A ship on a circle $e$ is liable to be captured when she is under concentrated fire. If she can turn so as to equalize the fire or if one of her own fleet ranges up alongside of the enemy, so as to take off some of the fire, it is no longer concentrated. When a player has placed a ship in either of the positions mentioned above, his opponent moves. Then if the ship is still in danger the player takes her off and moves. If a player runs his own ship into danger, his opponent takes her off at once and moves. A player capturing a flag-ship has another consecutive move. Any ship on the next circle $e$ ahead of any enemy in any position except bow on may be rammed and taken off the board. The ship ramming may not turn to ram. She may not move to the next circle and ram in the same move. After ramming the player may do what he likes with the remainder of his moves. Flag-ships or first-class ships ram along all lines. Second-class ships may not ram along the diagonal lines. A ship on a spot $f$ may not ram. If a player is in position to ram a ship on a spot $f$ and she cannot move, she surrenders, (is taken off the board,) and the player moves any vessel he likes.

Figs. 6, 7, 8, and 9 show a modified form of the counters. This form is useful in constructing cheap editions of the game. The counters in modification consist simply of flat pieces of material, on the top of which are painted the representations of the different classes of warships. Fig. 6 is a side elevation showing the height of the counters, while Figs. 7, 8, and 9 are plan views showing the tops of the counters, having produced thereon the representation of the turrets and barbettes, with which the counters in Figs. 3 and 5 are provided. Figs. 8 and 9 also show the openings in which the flagstaff may be planted, as explained above. Fig. 7 illustrates the form of the counter with which a separable flag is unnecessary, the flag being painted on the top of the counter.

The board shown in Fig. 10 instead of having the lines drawn across it, as shown in Fig. 1, is provided with grooves $o$, disposed the same as the lines $a$, $b$, $c$, and $d$ in Fig. 1 and running into circular depressions $p$. Some of the depressions $p$ are left plain, while others are provided with the characters described with reference to Fig. 1, and still others are blackened to take the place of the spots $f$, also of Fig. 1. Otherwise the arrangement of the board in Fig. 10 is exactly the same as that in Fig. 1. The counters for use in connection with the board 10 are shown in Fig. 12 and are similar to the counters previously described excepting that they are provided with dovetailed keels $q$, adapted to run in the grooves $o$ and to turn within the recesses $p$. This form of the invention is useful when the game is being used on shipboard or on a vehicle on land, the purpose of the construction being to prevent the counters from being displaced on the board by the vibrations of the moving vessel or vehicle.

Having thus described my invention, I claim as new and desire to secure by Letters Patent—

1. A game-board having vertical and horizontal lines crossing each other at right angles forming squares, and diagonal lines crossing each other at right angles in the squares formed by the vertical and horizontal lines and at the points of intersection of the said vertical and horizontal lines, sundry of the points of intersection of the several lines having characters indicating the manner in which counters are to be placed upon the board, substantially as described.

2. A game-board having vertical and horizontal lines crossing each other at right angles forming squares, and diagonal lines crossing each other at right angles in the squares formed by the vertical and horizontal lines and at the points of intersection of said vertical and horizontal lines, circles being produced at sundry of the points of intersection of the several lines, and spots at other points of intersection of said lines, substantially as described.

3. A game-board having vertical, horizontal and diagonal lines intersecting each other, the diagonal lines crossing each other at right angles in the squares formed by the vertical and horizontal lines, marks having characters indicating the starting-points for the men or counters being produced on sundry of the points of intersection of the lines at each end of the board, and marks serving to regulate the movement of the men or counters being produced on other points of intersection of said lines, substantially as described.

4. A game-board having vertical and horizontal lines crossing each other at right angles forming squares, and diagonal lines crossing each other at right angles in the squares formed by the vertical and horizontal lines and at the points of intersection of said vertical and horizontal lines, circles being produced upon sundry of the points of intersection of the said lines, sundry of the circles at each end of the board having characters indicating the manner in which counters or men are to be placed upon the board, substantially as described.

5. A game apparatus, comprising a board having grooves ranging in vertical, horizontal and diagonal lines and intersecting each other, the diagonal grooves crossing each other at right angles, in the squares formed by the vertical and horizontal grooves, circular depressions being formed at the intersections of the said lines, and counters provided with projections on the under faces to fit in the said grooves, substantially as described.

HENRY THOMAS PYCROFT.

Witnesses:
O. NICHOLSON,
GEO. O. GRIBBIN.